United States Patent
Bruna et al.

(10) Patent No.: US 7,116,832 B2
(45) Date of Patent: Oct. 3, 2006

(54) METHOD OF COMPRESSING DIGITAL IMAGES

(75) Inventors: Arcangelo Bruna, San Cataldo (IT); Massimo Mancuso, Monza (IT); Agostino Galluzzo, Palma di Montechiaro (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 733 days.

(21) Appl. No.: 09/901,458

(22) Filed: Jul. 9, 2001

(65) Prior Publication Data

US 2002/0039451 A1    Apr. 4, 2002

(30) Foreign Application Priority Data

Oct. 7, 2000    (EP) .................................. 00202437

(51) Int. Cl.
*G06K 9/36* (2006.01)
*H04N 5/76* (2006.01)

(52) U.S. Cl. .................... 382/239; 382/251; 348/231.2

(58) Field of Classification Search ................ 382/239, 382/251, 248, 232, 253, 238; 341/50; 348/231.2, 348/231.9, 231.89, 222.1
See application file for complete search history.

(56) References Cited

U.S. PATENT DOCUMENTS

| | | | |
|---|---|---|---|
| 5,677,689 A * | 10/1997 | Yovanof et al. ............... 341/50 |
| 5,838,826 A | 11/1998 | Enari et al. ................ 382/234 |
| 5,995,149 A | 11/1999 | Saunders et al. ............ 348/408 |
| 6,563,535 B1 * | 5/2003 | Anderson ................. 348/231.2 |
| 6,697,529 B1 * | 2/2004 | Kuniba ........................ 382/239 |

FOREIGN PATENT DOCUMENTS

| | | |
|---|---|---|
| EP | 0719052 | 6/1996 |
| EP | 0888010 | 12/1998 |
| EP | 0899961 | 3/1999 |

OTHER PUBLICATIONS

"Information technology—Digital compression and coding of continuous-tone still images: Requirements and guidelines," ISO/IEC 10918-1, 1994, especially pp. 2, 15-16, 18-21.*
"DCT-based still image compression ICs with bit-rate control," Nakagawa, Masaki, et al. IEEE Trans. On Consumer Electronics v. 38, No. 3, Aug. 1992, pp. 711-712.*

(Continued)

*Primary Examiner*—Wenpeng Chen
(74) *Attorney, Agent, or Firm*—Lisa K. Jorgenson; Allen, Dyer, Doppelt, Milbrath & Gilchrist, P.A.

(57) ABSTRACT

A method is for compressing a digital image including a matrix of elements, with each element including at least one component of a different type for representing a pixel. The method includes splitting the digital image into a plurality of blocks, and calculating for each block a group of discrete cosine transform (DCT) coefficients for the components of each type, and quantizing the DCT coefficients of each group using a corresponding quantization table scaled by a gain factor for achieving a target compression factor. The method also includes further quantizing the DCT coefficients of each group using the corresponding quantization table scaled by a pre-set factor, and arranging the further quantized DCT coefficients in a zig-zig vector.

27 Claims, 4 Drawing Sheets

OTHER PUBLICATIONS

Kim et al., Two-Layered DCT Based Coding Scheme for a Digital HD-VCR, Digest of Technical Papers of the International Conference on Consumerelectronics (ICCE), US, New York, Jun. 21, 1994, pp. 24-25, XP000503949.

Onishi et al., An Experimental Home-Use Digital VCR with Three Dimensional DCT and Superimposed Error Correction Coding, IEEE Transactions on Consumer Electronics, US, IEEE Inc. New York, vol. 37, No. 3, Aug. 1, 1991, pp. 252-259, XP000263193.

Kondo et al., A Real-Time Variable Bit Rate MPEG2 Video Coding Method for Digital Storage Media, IEEE Transactions on Consumer Electronics, US, IEEE Inc. New York, vol. 43, No. 3, Aug. 1, 1997, pp. 537-543, XP000742529.

* cited by examiner

METHOD OF COMPRESSING DIGITAL IMAGES

FIELD OF THE INVENTION

The present invention relates to the field of integrated circuits, and more particularly, to the compression of digital images.

BACKGROUND OF THE INVENTION

Digital images are commonly used in several applications such as, for example, in digital still cameras (DSC). A digital image includes a matrix of elements, commonly referred to as a bit map. Each element of the matrix, which represents an elemental area of the image (a pixel or pel), is formed by several digital values indicating corresponding components of the pixel.

Digital images are typically subjected to a compression process to increase the number of digital images which can be stored simultaneously, such as to a memory of the camera. Moreover, this allows transmission of digital images, such as over the internet, for example, to be easier and less time consuming. A compression method commonly used in standard applications is the JPEG (Joint Photographic Experts Group) algorithm, described in CCITT T.81, 1992.

In the JPEG algorithm, 8×8 pixel blocks are extracted from the digital image. Discrete cosine transform (DCT) coefficients are then calculated for the components of each block. The DCT coefficients are rounded off using corresponding quantization tables. The quantized DCT coefficients are encoded to obtain a compressed digital image, from which the corresponding original digital image may be later extracted by a decompression process.

In some applications, it is necessary to provide a substantially constant memory requirement for each compressed digital image, i.e., a compression factor control or CF-CTRL. This problem is particularly perceived in digital still cameras. In fact, in this case it must be ensured that a minimum number of compressed digital images can be stored in the memory of the camera to guarantee that a minimum number of photos can be taken by the camera.

The compression factor control is quite difficult in algorithms, such as the JPEG, wherein the size of the compressed digital image depends on the content of the corresponding original digital image. Generally, the compression factor is controlled by scaling the quantization tables using a multiplier coefficient (gain factor). The gain factor to obtain a target compression factor is determined using iterative methods. The compression process is executed several times, at least twice. The gain factor is modified according to the result of the preceding compression process, until the compressed digital image has a size that meets the target compression factor.

Current methods require a high computation time, so that they are quite slow. Moreover, these known methods require a considerable power consumption. This drawback is particularly acute when the compression method is implemented in a digital still camera or other portable devices which are powered by batteries.

SUMMARY OF THE INVENTION

In view of the foregoing background, it is an object of the present invention to overcome the above mentioned drawbacks.

This and other objects, advantages and features in accordance with the present invention are provided by a method of compressing a digital image that includes a matrix of elements, with each element comprising at least one component of a different type for representing a pixel. The method may comprise splitting the digital image into a plurality of blocks, and calculating for each block a group of DCT coefficients for the components of each type, and quantizing the DCT coefficients of each group using a corresponding quantization table scaled by a gain factor for achieving a target compression factor.

The method may further comprise further quantizing the DCT coefficients of each group using the corresponding quantization table scaled by a pre-set factor, and arranging the further quantized DCT coefficients in a zig-zig vector. A basic compression factor provided by the quantization table scaled by the pre-set factor may be calculated as a first function of the zig-zag vector. The gain factor may then be estimated as a second function of the basic compression factor. The second function is determined experimentally according to the target compression factor.

Moreover, the present invention also provides a corresponding device for compressing a digital image, and a digital still camera comprising this device.

BRIEF DESCRIPTION OF THE DRAWINGS

Further features and the advantages according to the present invention will be made clear by the following description of a preferred embodiment thereof, given purely by way of a non-restrictive example, with reference to the attached figures, in which.

DETAILED DESCRIPTION OF THE PREFERRED EMBODIMENTS

Figure 1:
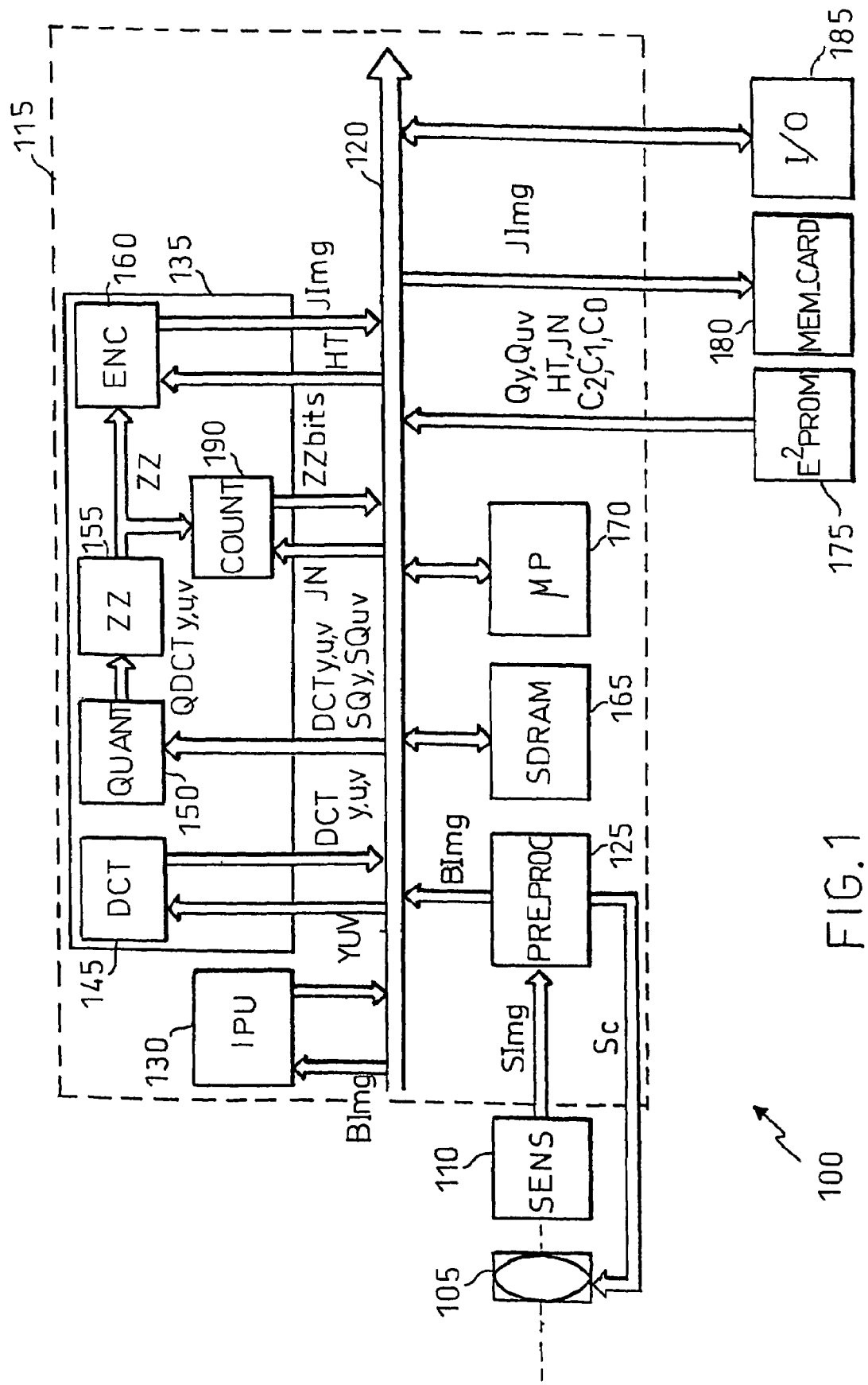
FIG. 1 is a schematic block diagram of a digital still camera for implementing the compression method according to the present invention.

With reference in particular to FIG. 1, a digital still camera (DSC) 100 is illustrated for taking digital images representative of real scenes. A digital image is formed by a matrix with N rows and M columns (for example, 640 rows by 480 columns). Each element of the matrix includes several digital values (for example, three values each one of 8 bits, ranging from 0 to 255) representative of respective optical components of a pixel.

The camera 100 includes an image-acquisition unit 105 formed by a diaphragm and a set of lenses for transmitting the light corresponding to the image of the real scene to a sensor unit (SENS) 110. The sensor unit 110 is typically formed by a charge-coupled device (CCD). A CCD is an integrated circuit which contains a matrix of light-sensitive cells. Each light-sensitive cell generates a voltage, the intensity of which is proportional to the exposure of the light-sensitive cell. The generated voltage is supplied to an analog/digital converter, which produces a corresponding digital value.

To reduce the number of light-sensitive cells, the sensor unit 110 does not detect all the components for every pixel. Typically, only one light-sensitive cell is provided for each pixel. The CCD is covered by a color filter that includes a matrix of filter elements. Each one is associated with a corresponding light-sensitive cell of the CCD. Each filter element transmits (absorbing a minimal portion) the luminous radiation belonging only to the wavelength of red, blue or green light (substantially absorbing the others). This is done to detect a red color component (R), a green color component (G), or a blue color component (B) for each pixel.

In particular, the filter may be of the Bayer type as described in U.S. Pat. No. 3,971,065, in which only the G component is detected for a half of the pixels, in a chess-board-like arrangement. The R component or the B component is detected for the other half of the pixels, in respective alternate rows, as shown in the following Table 1:

TABLE 1

| G | R | G | R | G | R | G | R | G |
| B | G | B | G | B | G | B | G | B |
| G | R | G | R | G | R | G | R | G |
| B | G | B | G | B | G | B | G | B |

An incomplete digital image SImg, in which each element includes a single color component (R, G or B), is output by the sensor unit 110.

The camera 100 includes a control unit 115 formed by several blocks which are connected in parallel to a communication bus 120. Particularly, a pre-processing unit (PRE_PROC) 125 receives the incomplete digital image SImg. The pre-processing unit 125 determines various parameters of the incomplete digital image Simg, such as a high-frequency content and an average luminosity. These parameters are used to automatically control a focus (auto-focus) and an exposure (auto-exposure) by corresponding control signals Sc which are supplied to the acquisition unit 105. The pre-processing unit 125 also modifies the incomplete digital image SImg, for example, by applying a white-balance algorithm which corrects the color shift of the light towards red (reddish) or towards blue (bluish) based upon the color temperature of the light source. A corresponding incomplete digital image BImg is output by the pre-processing unit 125 and sent onto the bus 120.

The incomplete digital image BImg is received by an image-processing unit (IPU) 130. The image-processing unit 130 interpolates the missing color components in each element of the incomplete digital image BImg to obtain a corresponding digital image RGB wherein each pixel is represented by the R component, the G component and the B component. The digital image RGB is then processed to improve image quality. For example, the image quality may be improved by correcting exposure problems such as back-lighting or excessive front illumination, reducing a noise introduced by the CDD, correcting alterations of a selected color tone, applying special effects (such as a mist effect), compensating the loss of sharpness due to a γ-correction function (typically applied by a television set). Moreover, the digital image can be enlarged, a desired portion of the image can be zoomed, or the ratio of its dimensions can be changed, for example, from 4:3 to 16:9, and the like.

The digital image RGB is then converted into a corresponding digital image YUV in a luminance/chrominance space. Each pixel of the digital image YUV is represented by a luminance component Y (providing information about the brightness), and two chrominance components Cu and CV for providing information about the hue. The Y,Cu,Cv components are calculated from the respective R,G,B components applying, for example, the following equations:

$Y=0.299 \cdot R+0.587 \cdot G+0.114 \cdot B$ $Cu=-0.1687 \cdot R-0.3313 \cdot G+0.5 \cdot B+128$ $Cv=0.5 \cdot R-0.4187 \cdot G-0.0813 \cdot B+128$ This allows chrominance information to be easily identified in order to discard more chrominance information that luminance information during a following compression process of the digital image, since the human eye is more sensitive to luminance than chrominance. The digital image YUV is sent to the bus 120.

A compression unit 135 is also connected to the bus 120. The compression unit 135 receives the digital image YUV and outputs a corresponding digital image JImg compressed by applying a JPEG algorithm. The compression unit 135 includes a discrete cosine transform (DCT) unit 145, which is input the digital image YUV. Each component of the digital image YUV is shifted from the range 0 ... 255 to the range −128 ... +127, to normalize the result of the operation. The digital image YUV is then split into several blocks of 8×8 pixels (640×480/64=4800 blocks in the example). Each block of Y components BLy, each block of Cu components BLu, and each block of Cv components BLv is translated into a group of DCT coefficients DCTy, a group of DCT coefficients DCTu, and a group of DCT coefficients DCTv, respectively, representing a spatial frequency of the corresponding components. The DCT coefficients DCTy, u,v [h, k] (with h, k=0 ... 7) are calculated using the following formula:

$$DCT_{y,u,v[h,k]} = \frac{1}{4}DhDk\sum_{x=0}^{7}\sum_{y=0}^{7} BLy, u, v[x, y]\cos\frac{(2h+1)x\pi}{16}\cos\frac{(2h+1)y\pi}{16}$$

wherein Dh, Dk=1/√2 for h,k=0 and Dh,Dk=1. The first DCT coefficient of each group is referred to as a DC coefficient, and it is proportional to the average of the components of the group, whereas the other DCT coefficients are referred to as AC coefficients. The groups of DCT coefficients DCTy, u,v are sent to the bus 120.

The compression unit 135 further includes a quantizer (QUANT) 150, which receives from the bus 120 the groups of DCT coefficients DCTy, u,v, and a scaled quantization table for each type of component. Typically, a scaled quantization table SQy is used for the Y components and a scaled quantization table SQuv is used for both the Cu components and the Cv components. Each scaled quantization table SQy,SQuv includes a 8×8 matrix of quantization constants. The DCT coefficients of each group are divided by the corresponding quantization constants and rounded off to the nearest integer. As a consequence, smaller and unimportant DCT coefficients disappear and larger DCT coefficients lose unnecessary precision. The quantization process generates corresponding groups of quantized DCT coefficients QDCTy for the Y component, groups of quantized DCT coefficients QDCTu for the Cu component, and groups of quantized DCT coefficients QDCTv for the Cv component.

These values drastically reduce the amount of information required to represent the digital image. The JPEG algorithm is then a lossy compression method, wherein some information about the original image is finally lost during the compression process. However, no image degradation is usually visible to the human eye at normal magnification in the corresponding de-compressed digital image for a compression ratio ranging from 10:1 to 20:1. This is defined as the ratio between the number of bits required to represent the digital image YUV, and the number of bits required to represent the compressed digital image JImg.

Each scaled quantization table SQy,SQuv is obtained by multiplying a corresponding quantization table Qy,Quv by a gain factor G (determined as set out in the following), that is, SQy=G•Qy and SQuv=G•Quv. The gain factor G is used to obtain a desired target compression factor $bp_t$ of the JPEG algorithm, defined as the ratio between the number of bits of the compressed digital image JImg and the number of pixels. Particularly, if the gain factor G is greater than 1, the compression factor is reduced compared to the one provided by the quantization tables Qy,Quv, whereas if the gain factor G is less than 1 the compression factor is increased.

The quantization tables Qy,Quv are defined so as to discard more chrominance information than luminance information. For example, the quantization table Qy (Table 2) is:

TABLE 2

| 1  | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 8   | 62  |
| 18 | 22 | 37 | 56 | 68  | 109 | 203 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  | and the quantization table Quv (Table 3) is:

TABLE 3

| 1  | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |
| 99 | 66 | 99 | 99 | 99 | 99 | 99 | 99 |

Preferably, the quantization constants for the DC coefficients are equal to 1 in both cases. This is done to not lose any information about the mean content of each block, and then to avoid the so-called "block-effect", wherein a contrast is perceivable between the blocks of the de-compressed image.

The groups of quantized DCT coefficients QDCTy, u,v are directly provided to a zig-zag unit (ZZ) 155. The zig-zag unit 155 modifies and reorders the quantized DCT coefficients to obtain a single vector ZZ of digital values. Each quantized DC coefficient (the one of a first group) is represented as the difference from the quantized DC coefficient of a previous group. The quantized AC coefficients are arranged in a zig-zag order so that quantized AC coefficients representing low frequencies are moved to the beginning of the group, and quantized AC coefficients representing high frequencies are moved to the end of the group. Since the quantized AC coefficients representing high frequencies are more likely to be zeros, this increases the probability of having longer sequences of zeros in the vector ZZ, which requires a lower number of bits in a run length encoding scheme.

The vector ZZ is directly provided to an encoder (ENC) 160, which also receives one or more encoding tables HT from the bus 120. Each value of the vector ZZ is encoded using a Huffman scheme, wherein the value is represented by a variable number of bits which is inversely proportional to a statistical frequency of use thereof. The encoder 160 then generates the corresponding compressed digital image JImg (which is sent to the bus 120). The compressed digital image JImg is typically formed by a header followed by the encoded values. If the last encoded value associated with a block is equal to 00, it must be followed by an (variable) End of Block (EOB) control word. Moreover, if an encoded value is equal to a further control word FF (used as a marker), this value must be followed by a 00 value.

The control unit 115 also includes a working memory 165, typically a SDRAM (Synchronous Dynamic Random Access Memory) and a microprocessor (μP) 170, which controls the operation of the device. Several peripheral units are further connected to the bus 120 by a respective interface. Particularly, a non-volatile memory 175, typically a flash EEPROM, stores the quantization tables Qy,Quv and the encoding tables HT, and a control program for the microprocessor 170. A memory card (MEM_CARD) 180 is used to store the compressed digital images Jimg. The memory card 185 has a capacity of a few Mbytes, and can store several tens of compressed digital images JImg. At the end, the camera 100 includes an input/output (I/O) unit 185 that includes, for example, a series of push-buttons for enabling the user to select various functions of the camera 100. These push-buttons may include an on/off button, an image quality selection button, a shot button, and a zoom control button. The camera 100 also includes a liquid-crystal display (LCD), for supplying data on the operative state of the camera 100 to the user.

Likewise, considerations apply if the camera has a different architecture or includes different units, such as equivalent communication means, a CMOS sensor, a viewfinder or an interface for connection to a personal computer (PC) and a television set, if another color filter (not with a Bayer pattern) is used, if the compressed digital images are directly sent outside the camera (without being stored onto the memory card), and so on.

Alternatively, considerations also apply if the digital image is converted into another space (not a luminance/chrominance space), the digital image RGB is directly compressed (without being converted), the digital image YUV is manipulated to down-sample the Cu,Cv components by averaging groups of pixels together to eliminate further information without sacrificing overall image quality, or no elaboration of the digital image is performed. Similarly, one or more different quantization tables are used, arithmetic encoding schemes are used, and a different compression algorithm is used, such as a progressive JPEG. Moreover, the compression method of the present invention leads itself to be implemented even in a different apparatus, such as a portable scanner, a computer in which graphic applications are provided, and the like.

The inventors have discovered that the gain factor G for obtaining the target compression factor $bp_t$ is a function of a basic compression factor $bp_b$, which is obtained using the quantization tables Qy,Quv scaled by a pre-set factor S. The function depends on the target compression factor $bp_t$, and can be determined a priori by a statistical analysis. The function may also depend on the characteristics of the camera 100, such as the dimension of the CCD, the size of the digital image, and the quantization tables used.

Figure 2:
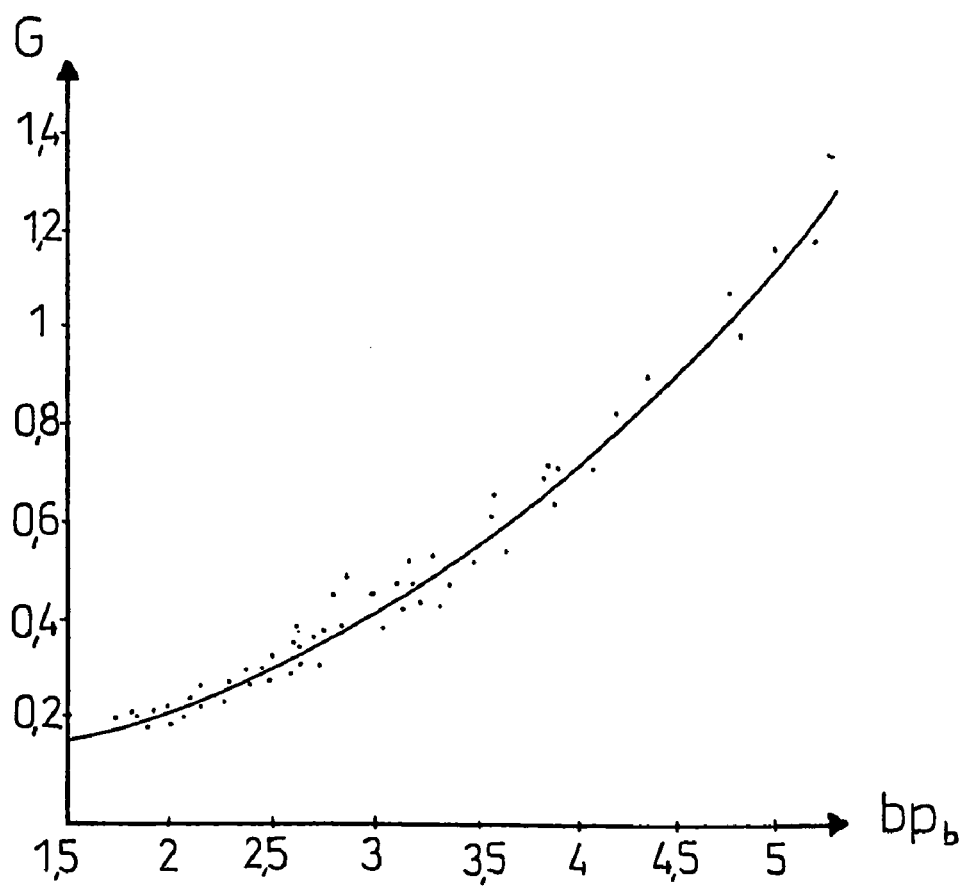
FIG. 2 is a plot illustrating an example of the relation between the basic compression factor/gain factor.

For example, FIG. 2 shows a relation between the basic compression factor $bp_b$ and the gain factor G for a camera having a CDD with 1 million light-sensitive cells and for images of 640×480 pixels, with a factor S=0.2 and a target compression factor $bp_t$=2 bit/pel. This relation can be interpolated as a quadratic function. In other words, the gain factor G can be estimated using the relation $$G = C_2 \cdot bp_b^2 + C_1 \cdot bp_b + C_0.$$

The parameters C2, C1 and C0 depend on the characteristics of the camera 100 and the target compression factor $bp_t$.

To calculate the basic compression factor $bp_b$, the quantizer 150 is supplied with scaled quantization tables SQy, SQuv obtained multiplying the corresponding quantization tables Qy,Quv by the pre-set factor S, that is, SQy=S•Qy and SQuv=S•Quv. The quantizer 150 determines the corresponding groups of quantized DCT coefficients QDCTy, u,v and the zig-zag unit 155 modifies and reorders the quantized DCT coefficients to obtain the vector ZZ.

The vector ZZ is directly provided to a counting unit (COUNT) 190, which outputs the number of bits ZZbits required to encode, in the compressed digital image Jimg, the values of the vector ZZ associated with each block. A look-up table JN is stored in the EEPROM 175 and is sent to the counting unit 190 by the bus 120. Each row of the look-up table JN, addressable by the values of the vector ZZ associated with a block, contains the respective number ZZbits.

The basic compression factor bpb is calculated by summing the numbers ZZbits associated with each block. A constant value indicating the number of bits required to encode the header of the compressed digital image JImg is then added to the sum. The result is divided by the number of pixels (N.M).

More generally, the method of the present invention includes the steps of further quantizing the DCT coefficients of each group using the corresponding quantization table scaled by a pre-set factor, arranging the further quantized DCT coefficients in a zig-zig vector, and calculating a basic compression factor provided by the quantization table scaled by the pre-set factor as a first function of the zig-zag vector. The gain factor is estimated as a second function of the basic compression factor. The second function is determined experimentally according to the target compression factor.

The method of the invention is very fast, in that only some of the operations performed by the compression unit, i.e., the quantization and the zig-zag reordering, are executed twice. In this respect, it should be noted that the operations performed by the counting unit 190 are simpler and faster then the ones performed by the encoder 160.

The approach according to the present invention is particularly advantageous in portable devices supplied by batteries, even if different applications are not excluded, since it drastically reduces the power consumption.

These results are achieved with a low error (on the order of a few units) between the target compression factor $bp_t$ and a compression factor $bp_a$ actually obtained, defined as $(bp_t - bp_a)/bp_t$. Experimental results on the camera provided a mean error of −1%, with a distribution of 98% between ±6% and 100% between ±10%. The negative error is more important than the positive error because the size of the compressed digital image is bigger than the target one.

In the above described architecture, a single quantizer 150 is provided. The quantizer 150 is supplied with the scaled quantization tables SQy,SQuv obtained by multiplying the corresponding quantization tables Qy,Quv by the pre-set factor S for calculating the number Zzbits, or with the scaled quantization tables SQy,SQuv obtained by multiplying the corresponding quantization tables Qy,Quv by the gain factor G for generating the compressed digital image JImg. This approach is relatively straight forward and flexible.

Preferably, two or more sets of parameters C2,C1,C0, each one associated with a different value of the target compression factor $bp_t$ and with a different size of the digital image, are determined a priori by a statistical analysis. A look-up table, wherein each row addressable by the value of the target compression factor $bp_t$ contains the respective parameters C2,C1,C0, is stored in the EEPROM 175. This feature allows different compression factors to be easily selected by the user.

Advantageously, the factor S is determined a priori by a statistical analysis to further reduce the error between the target compression factor $bp_t$ and the actual compression factor $bp_a$. Experimental results have shown that the factor S which minimizes the error also depends on the target compression factor $bp_t$, in addition to the characteristics of the camera 100.

Alternatively, the basic compression factor $bp_b$ is calculated in a different manner, for example, by software from the whole vector ZZ. The relation $bp_b$/E is interpolated with a different function, such as a logarithmic function. The look-up table with the parameters C2,C1,C0 is stored elsewhere or a different memory structure is used. The tables Qy,Quv are embedded in the quantizer 150, which is supplied with the pre-set factor S or the gain factor G. More generally, the quantizer is operated in two different conditions using the quantization tables scaled by the pre-set factor S or the gain factor G, respectively.

However, the method of the present invention leads itself to be carried out even with two distinct quantizers, with only one set of parameters C2,C1,C0, with the quadratic function implemented by software, and with the factor S set to a constant value, even equal to 1 and being irrespective of the target compression factor $bp_t$.

Figure 3A:
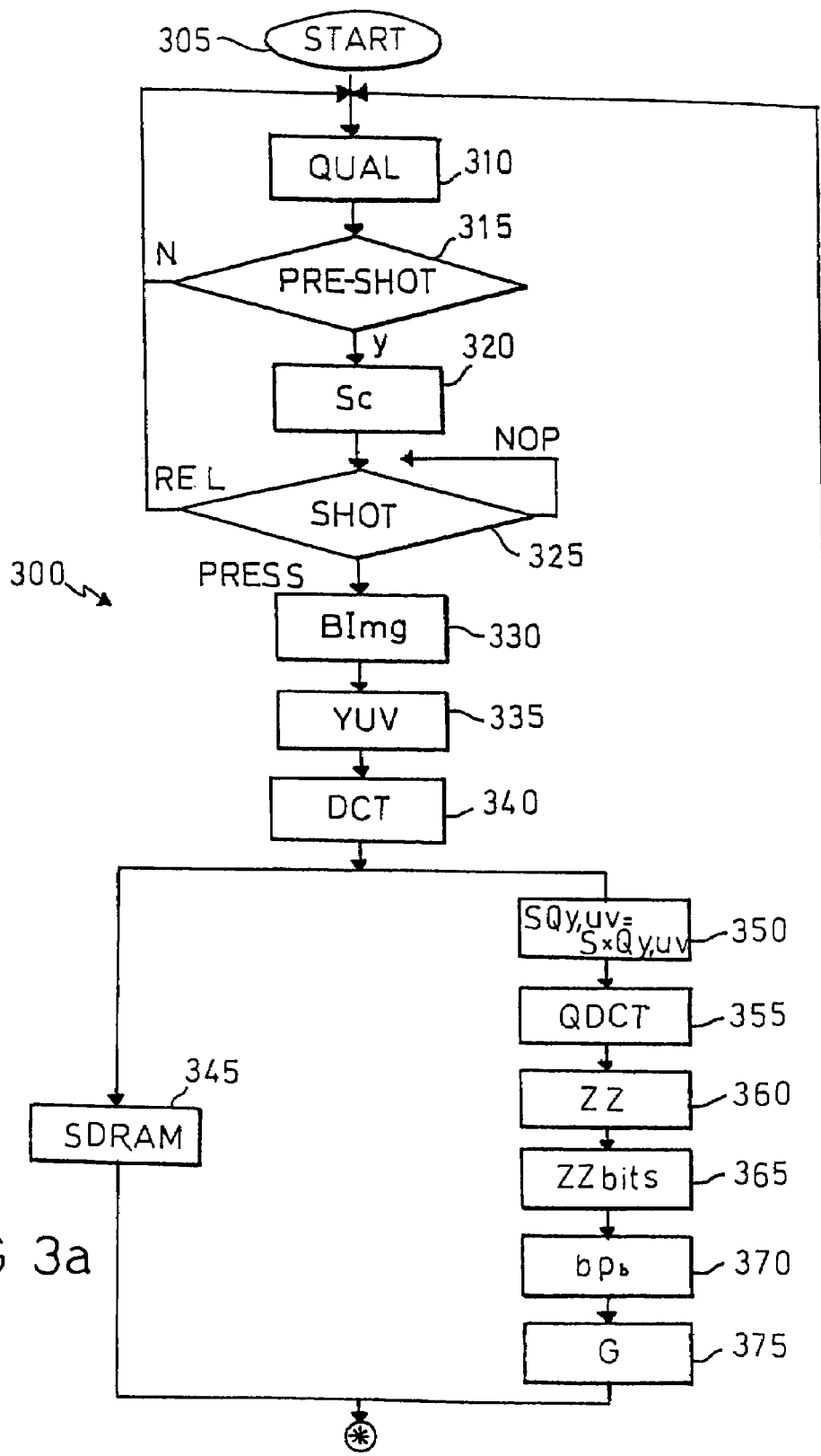
FIGS. 3a–3b are flow charts illustrating the compression method according to the present invention.
Figure 3B:
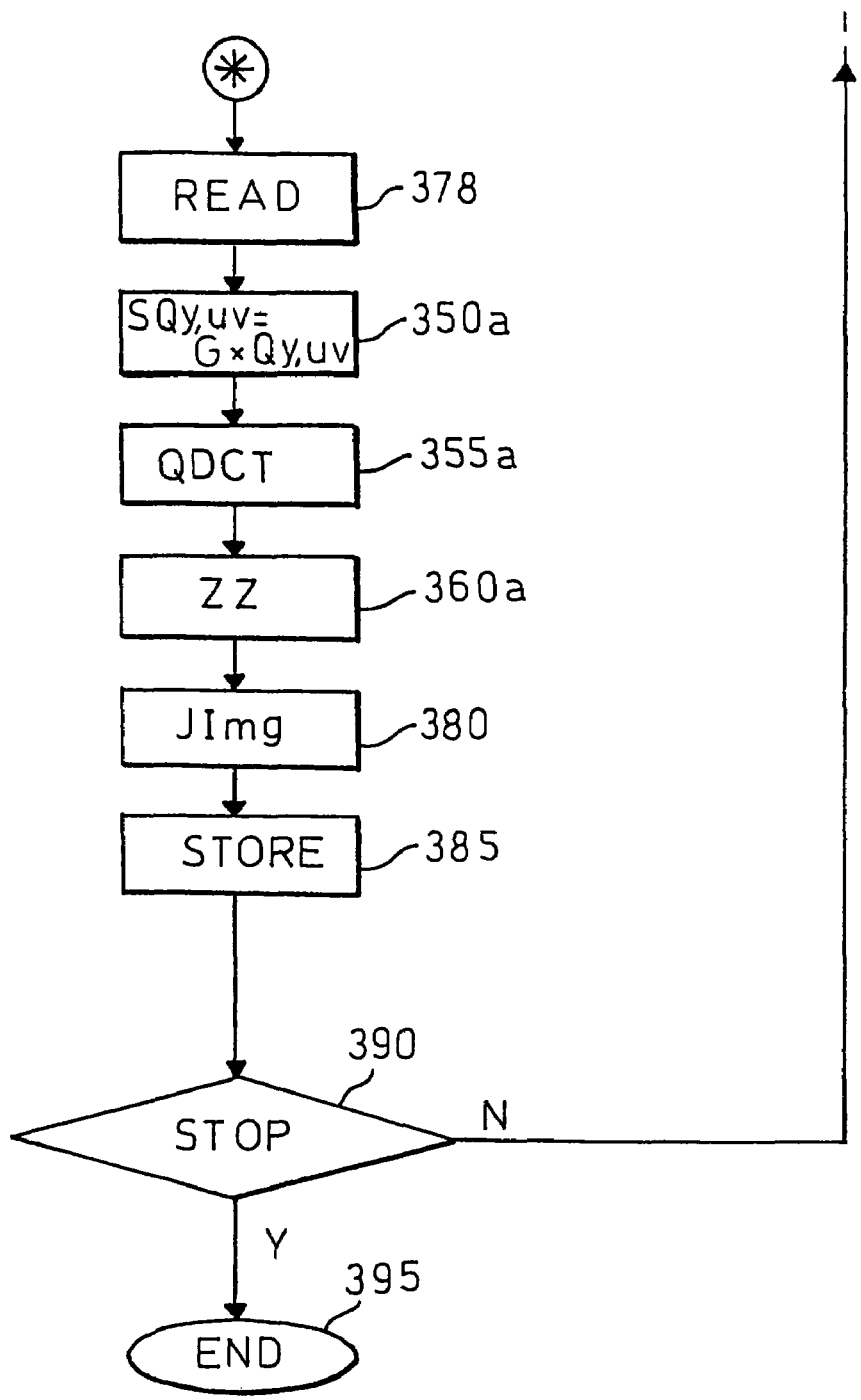

To explain the operation of the camera, reference is made to FIGS. 3a–3b together with FIG. 1. When the camera 100 is switched on by the user via the on/off button, the microprocessor 170 runs the control program stored in the EEPROM 175. A method 300 corresponding to this control program starts at block 305 and then passes to block 310, wherein the user selects the desired quality of the image, such as low or high, by acting on the corresponding button. The microprocessor 170 determines and stores in the SDRAM 165 the target compression factor $bp_t$ corresponding to the selected image quality, for example, 1 bit/pel for the low quality and 2 bit/pel for the high quality.

The method checks at block 315 if the shot button has been partially pressed to focus the image. If not, the method returns to block 310. As soon as the user partially presses the shot button, the method proceeds to block 320, wherein the incomplete digital image SImg is acquired by the sensor unit 110. The diaphragm is always open and the light is focused by the lenses, through the Bayer filter, onto the CCD. The pre-processing unit 125 then controls the acquisition unit 115 by the control signals Sc, according to the content of the incomplete digital image SImg.

The method checks again the status of the shot button at block 325. If the shot button has been released, the method returns to block 310. If the shot button has been completely pressed to take a photo, the method continues to block 330. If no action is performed by the user, the method stays in block 325 in an idle loop.

Considering now block 330, the incomplete digital image SImg is acquired by the sensor unit 110 and modified by the pre-processing unit 125. The corresponding incomplete digital image BImg is stored in the SDRAM 165. The method passes to block 335, wherein the incomplete digital image BImg is read from the SDRAM 165 and is provided to the image-processing unit 130. The image-processing unit 130 interpolates the missing color components in each element of the incomplete digital image Bimg. This is done to obtain the corresponding digital image RGB. The digital image RGB is modified to improve the image quality. The digital image RGB is then converted into the corresponding digital image YUV. Proceeding to block 340, the digital image YUV is provided to the DCT unit 140. The DCT unit 140 calculates the groups of DCT coefficients DCTy, u,v, which are sent to the bus 120.

The method then forks into two branches which are executed concurrently. A first branch includes block 345, and a second branch includes blocks 350–375. The two branches are joined at block 378.

Considering now block 345, the groups of DCT coefficients DCTy, u,v are received and stored in the SDRAM 165. At the same time, at block 350, the groups of DCT coefficients DCTy, u,v are also received by the quantizer 150. Meanwhile, the microprocessor 170 reads the quantization tables Qy,Quv from the EEPROM 175 and calculates the scaled quantization tables SQy,SQuv by multiplying the respective quantization tables Qy,Quv by the pre-set factor S. The scaled quantization tables SQy,SQuv are then provided to the quantizer 150. Continuing to block 355, the quantizer 150 generates the corresponding groups of quantized DCT coefficients QDCTy, u,v. The method proceeds to block 360, wherein the quantized DCT coefficients QDCTy, u,v are transformed into the vector ZZ by the zig-zag unit 155.

Considering now block 365, the vector ZZ is provided to the counting unit 190. At the same time, the look-up table JN is read from the EEPROM 175 and sent to the counting unit 190, which determines the number ZZbits. The microprocessor 170 receives the number ZZbits at block 370, and calculates the basic compression factor $bp_b$ accordingly. Continuing now to block 375, the microprocessor reads the parameters C2,C1,C0 associated with the target compression factor $bp_t$ from the EEPROM 175 for addressing the look-up table by the value of the target compression factor $bp_t$. The microprocessor 170 then estimates the gain factor G for obtaining the target compression factor $bp_t$ using the read parameters C2,C1,C0.

Considering now block 378, the groups of DCT coefficients DCTy, u,v are read from the SDRAM 165 and sent to the bus 120. The groups of DCT coefficients DCTy, u,v are received by the quantizer 150 at block 350a. Meanwhile, the microprocessor 170 reads the quantization tables Qy,Quv from the EEPROM 175 and calculates the scaled quantization tables SQy,SQuv by multiplying the respective quantization tables Qy,Quv by the gain factor G. The scaled quantization tables SQy,SQuv are then provided to the quantizer 150. Continuing to block 355a, the quantizer 150 generates the corresponding groups of quantized DCT coefficients QDCTy, u,v.

The method proceeds to block 360a, wherein the quantized DCT coefficients QDCTy,u,v are transformed into the vector ZZ by the zig-zag unit 155. The vector ZZ is supplied, at block 380, to the encoder 160, which generates the corresponding compressed digital image Jimg. The compressed digital image JImg is then stored in the SDRAM 165. Continuing to block 385, the compressed digital image JImg is read from the SDRAM 165 and sent to the memory card 180.

The method than checks at block 390 if a stop condition has occurred, for example, if the user has switched off the camera 100 via the on/off button, or if the memory card 180 is full. If not, the method returns to block 310, on the other end, the method ends at block 395.

The preferred embodiment of the present invention described above, with the counting unit implemented in hardware and the basic compression factor calculation and gain factor estimation functions implemented in software, is a good trade-off between speed and flexibility.

Moreover, this approach requires the operations performed by the DCT unit 145 to be carried out only once. Likewise considerations apply if the program executes a different equivalent method, for example, with error routines, with sequential processes, and the like. In any case, the method of the present invention leads itself to be carried out even with all the functions completely implemented in hardware or in software, and with the DCT coefficients calculated twice.

Naturally, to satisfy local and specific requirements, a person skilled in the art may apply to the above described approach many modifications and alterations all of which, however, are included within the scope of protection of the invention as defined by the following claims.

That which is claimed is:

1. A method for compressing a digital image comprising a matrix of elements, each element comprising at least one digital component for representing a pixel, the method comprising:
   splitting the digital image into a plurality of blocks, and calculating for each block a group of discrete cosine transform (DCT) coefficients for the different types of components;
   quantizing the DCT coefficients for each group using a corresponding quantization table scaled by a gain factor for achieving a target compression factor;
   further quantizing the DCT coefficients for each group using the corresponding quantization table scaled by a pre-set factor;
   arranging the further quantized DCT coefficients in a vector;
   calculating a basic compression factor provided by the quantization table scaled by the pre-set factor as a first function of the vector, the calculating comprising
      determining a first number of bits required to encode the vector for each block;
      summing all the first numbers of bits associated with each block with a second number of bits required to encode control values, and
      dividing the sum by a number of elements of the digital image; and estimating the gain factor as a second function of the basic compression factor, the second function being determined experimentally according to the target compression factor.

2. A method according to claim 1, wherein each element comprises a plurality of digital components of different types; and wherein each element of the digital image comprises a luminance component, a first chrominance component, and a second chrominance component.

3. A method according to claim 1, wherein the vector comprises a zig-zag vector with quantized coefficients representing low frequencies being arranged at a beginning of the vector, and quantized coefficients representing high frequencies being arranged at an end of the vector.

4. A method according to claim 1, wherein the second function is a quadratic function.

5. A method according to claim 1, further comprising:
storing a plurality of sets of parameters representing the second function, each set of parameters being associated with a corresponding value of the target compression factor;
selecting an image quality and determining a current value of the target compression factor as a function of the selected image quality; and
reading the parameters associated with the current value of the target compression factor and estimating the gain factor.

6. A method according to claim 1, wherein the pre-set factor is determined experimentally according to the target compression factor.

7. A method according to claim 1, further comprising:
storing the DCT coefficients in a memory and concurrently performing the further quantizing of the DCT coefficients for each group using the corresponding quantization table scaled by the preset factor, arranging the further quantized DCT coefficients in the vector, calculating the basic compression factor, and estimating the gain factor; and
reading the DCT coefficients from the memory for performing the quantizing of the DCT coefficients for each group using the corresponding quantization table scaled by the gain factor.

8. A method for compressing a digital image comprising a matrix of elements, each element comprising at least one digital component for representing a pixel, the method comprising:
splitting the digital image into a plurality of blocks, and calculating for each block a group of discrete cosine transform (DCT) coefficients for the different types of components;
quantizing the DCT coefficients for each group using a corresponding quantization table scaled by a gain factor for achieving a target compression factor;
further quantizing the DCT coefficients for each group using the corresponding quantization table scaled by a pre-set factor;
arranging the further quantized DCT coefficients in a vector;
calculating a basic compression factor provided by the quantization table scaled by the pre-set factor as a first function of the vector by
determining a first number of bits required to encode the vector for each block, and
summing all the first numbers of bits associated with each block with a second number of bits required to encode control values, and dividing the sum by a number of elements of the digital image; and
estimating the gain factor as a second function of the basic compression factor.

9. A method according to claim 8, wherein the second function is determined experimentally according to the target compression factor.

10. A method according to claim 8, wherein each element comprises a plurality of digital components of different types; and wherein each element of the digital image comprises a luminance component, a first chrominance component, and a second chrominance component.

11. A method according to claim 8, wherein the vector comprises a zig-zag vector with quantized coefficients representing low frequencies being arranged at a beginning of the vector, and quantized coefficients representing high frequencies being arranged at an end of the vector.

12. A method according to claim 8, wherein the second function is a quadratic function.

13. A method according to claim 8, further comprising:
storing a plurality of sets of parameters representing the second function, each set of parameters being associated with a corresponding value of the target compression factor;
selecting an image quality and determining a current value of the target compression factor as a function of the selected image quality; and
reading the parameters associated with the current value of the target compression factor and estimating the gain factor.

14. A method according to claim 8, wherein the pre-set factor is determined experimentally according to the target compression factor.

15. A method according to claim 8, further comprising:
storing the DCT coefficients in a memory and concurrently performing the further quantizing of the DCT coefficients for each group using the corresponding quantization table scaled by the pre-set factor, arranging the further quantized DCT coefficients in the vector, calculating the basic compression factor, and estimating the gain factor; and
reading the DCT coefficients from the memory for performing the quantizing of the DCT coefficients for each group using the corresponding quantization table scaled by the gain factor.

16. A device for compressing a digital image comprising a matrix of elements, each element comprising at least one digital component for representing a pixel, the device comprising:
discrete cosine transform (DCT) means for splitting the digital image into a plurality of blocks, and calculating for each block a group of DCT coefficients for the different types of components;
quantization means for
quantizing the DCT coefficients of each group using a corresponding quantization table scaled by a gain factor for achieving a target compression factor, and
further quantizing the DCT coefficients of each group using the corresponding quantization table scaled by a pre-set factor;
arranging means for arranging the further quantized DCT coefficients in a vector;
calculation means for calculating a basic compression factor provided by the quantization table scaled by the pre-set factor as a first function of the vector, the calculating comprising
determining a first number of bits required to encode the vector for each block,
summing all the first numbers of bits associated with each block with a second number of bits required to encode control values, and
dividing the sum by a number of elements of the digital image; and
estimation means for estimating the gain factor as a second function of the basic compression factor, the second function being determined experimentally according to the target compression factor.

17. A device according to claim 16, wherein each element comprises a plurality of digital components of different types; and wherein each element of the digital image comprises a luminance component, a first chrominance component, and a second chrominance component.

18. A device according to claim 16, wherein the vector comprises a zig-zag vector with quantized coefficients representing low frequencies being arranged at a beginning of the vector, and quantized coefficients representing high frequencies being arranged at an end of the vector.

19. A device according to claim 16, wherein said quantization means quantizes the DCT coefficients for each group using the corresponding quantization table scaled by the gain factor in a first operative condition, and quantizes the DCT coefficients for each group using the corresponding quantization table scaled by the pre-set factor in a second operative condition.

20. A device according to claim 16, wherein said DCT means comprises a DCT unit; wherein said quantization means comprises a quantization unit; wherein said arranging means comprises a vector unit; and wherein said estimation means comprises a processor for controlling the compression of the digital image; the device further comprising:

a memory for storing the quantization tables;

a counter for calculating the first number of bits; and communication means for connecting said DCT unit, said quantization unit, said vector unit, said processor, said memory, and said counter together.

21. A device according to claim 20, wherein said processor calculates the basic compresson factor and estimates the gain factor under control of a program stored in said memory.

22. A digital still camera comprising:

an image acquisition unit for transmitting light corresponding to an image of scene;

a sensor unit connected to said image acquisition unit for providing digital image of scene, the digital image comprising a matrix of elements, each element comprising at least one digital component for representing a pixel; and a control device for compressing the digital image and comprising a discrete cosine transform (DCT) unit splitting the digital image into a plurality of blocks, and calculating for each block a group of DCT coefficients for the different types of components;

a quantization unit for quantizing the DCT coefficients of each group using a corresponding quantization table scaled by a gain factor for achieving a target compression factor, and further quantizing the DCT coefficients of each group using the corresponding quantization table scaled by a pre-set factor;

a zig-zag unit for arranging the further quantized DCT coefficients a vector; and a processor for calculating a basic compression factor provided by the quantization table scaled by the pre-set factor as a first function of the vector, and for estimating the gain factor as a second function of the basic compression factor, the second function being determined experimentally according to the target compression factor, and the calculating comprising determining a first number of bits required to encode the vector for each block, summing all the first numbers of bits associated with each block with a second number of bits required to encode control values, and dividing the sum by a number of elements of the digital image.

23. A digital still camera according to claim 22, wherein each element comprises a plurality of digital components of different types; and wherein each element of the digital image comprises a luminance component, a first chrominance component, and a second chrominance component.

24. A digital still camera according to claim 22, wherein the vector comprises a zig-zag vector with quantized coefficients representing low frequencies being arranged at a beginning of the vector, and quantized coefficients representing high frequencies being arranged at an end of the vector.

25. A digital still camera according to claim 22, wherein said quantization unit quantizes the DCT coefficients for each group using the corresponding quantization table scaled by the gain factor in a first operative condition, and quantizes the DCT coefficients for each group using the corresponding quantization table scaled by the pre-set factor in a second operative condition.

26. A digital still camera according to claim 22 further comprising:

a memory for storing the quantization tables;

a counter for calculating the first number of bits; and a bus for connecting said DCT unit, said quantization unit, said vector unit, said processor, said memory, and said counter together.

27. A digital still camera according to claim 26, wherein said processor calculates the basic compression factor and estimates the gain factor under control of a program stored in said memory.

* * * * *

UNITED STATES PATENT AND TRADEMARK OFFICE
CERTIFICATE OF CORRECTION

PATENT NO. : 7,116,832 B2  
APPLICATION NO. : 09/901458  
DATED : October 3, 2006  
INVENTOR(S) : Bruna et al.

It is certified that error appears in the above-identified patent and that said Letters Patent is hereby corrected as shown below:

| | |
|---|---|
| Title Page, Item 30 | Delete: "Oct. 7, 2000"<br>Insert: --July 10, 2000-- |
| Column 4, Line 8 | Delete: "that"<br>Insert: --than-- |
| Column 10, Line 1 | Delete: "than"<br>Insert: --then-- |
| Column 13, Line 30 | Delete: "providing digital"<br>Insert: --providing a digital-- |
| Column 13, Line 49 | Delete: "coefficients a"<br>Insert: --coefficients in a-- |

Signed and Sealed this

Tenth Day of July, 2007

JON W. DUDAS  
*Director of the United States Patent and Trademark Office*